United States Patent [19]
Fornasari

[11] Patent Number: 4,842,167
[45] Date of Patent: Jun. 27, 1989

[54] LIQUID DISPENSING DEVICE WHICH DELIVERS A PRE-SET, CONSTANT VOLUME INDEPENDENT OF THE PRESSURE AND VOLUME OF THE LIQUID SUPPLIED TO IT

[75] Inventor: Paolo Fornasari, Alessandria, Italy

[73] Assignee: Eltek S.p.A., Alessandria, Italy

[21] Appl. No.: 134,149

[22] Filed: Dec. 17, 1987

[30] Foreign Application Priority Data

Feb. 2, 1987 [IT] Italy .................... 67066 A/87

[51] Int. Cl.$^4$ .................................. G01F 11/04
[52] U.S. Cl. .................... 222/249; 222/16; 222/389
[58] Field of Search ........... 222/340, 341, 339, 559, 222/484, 504, 509, 511, 518, 14, 15, 16, 249, 250, 389; 141/21, 25, 27

[56] References Cited

U.S. PATENT DOCUMENTS 2,921,351 1/1960 Momm ..................... 222/504
3,537,620 11/1970 Artmani ..................... 222/340

Primary Examiner—Joseph J. Rolla
Assistant Examiner—Kenneth Noland
Attorney, Agent, or Firm—Browdy and Neimark

[57] ABSTRACT

A liquid dispensing device delivering a constant volume independent of the pressure and volume of the liquid received comprising a cylinder which houses a mobile, sealed piston. The piston moves against the reaction of elastic devices owing to the pressure of a liquid supplied through an orifice of an ancillary cylinder. A valve associated with the shaft of a small piston mounted in a mobile fashion in the ancillary cylinder controls the flow of the liquid through the orifice. The small piston is moved by the action of a plunger against the reaction of elastic devices. The plunger is controlled by a thermoactuator.

7 Claims, 1 Drawing Sheet

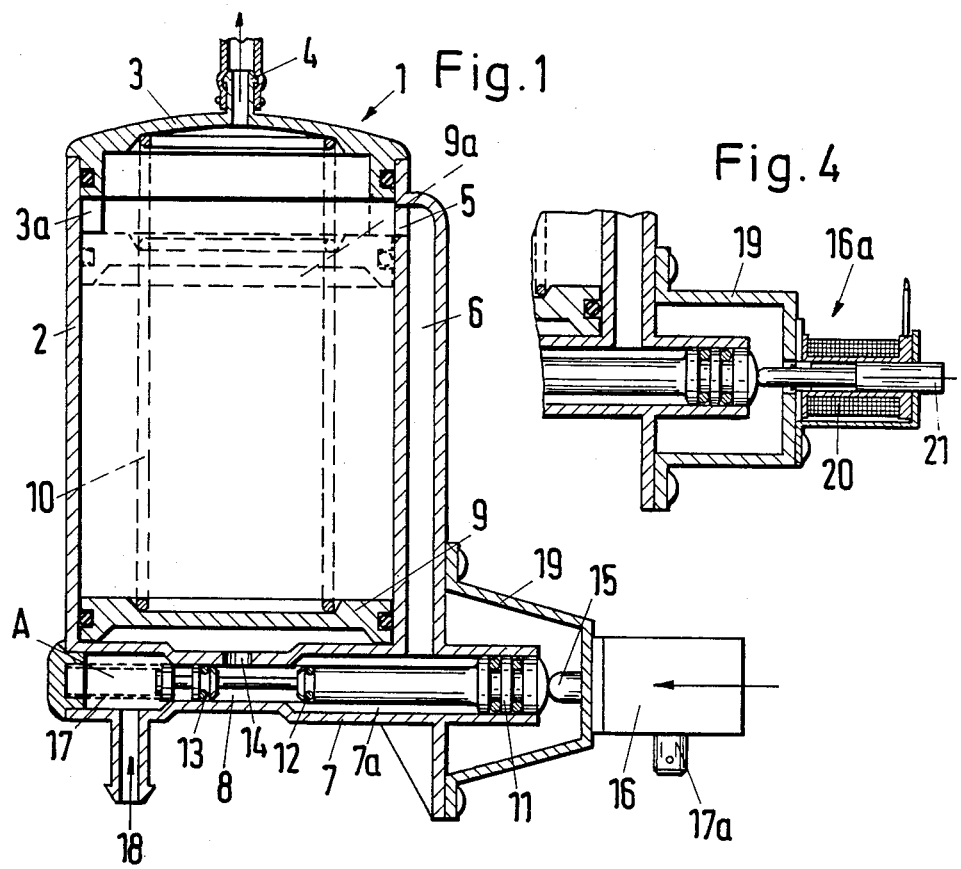
Fig. 1
Fig. 4
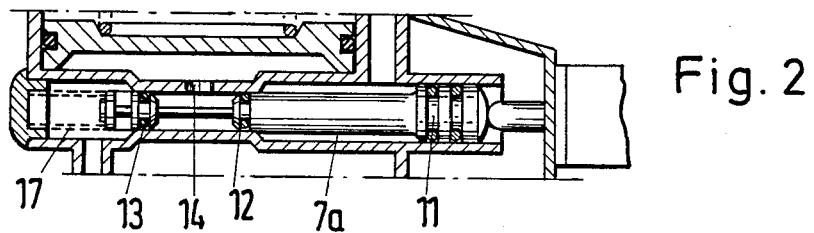
Fig. 2
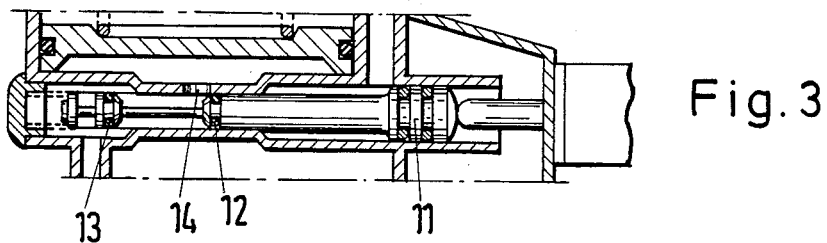
Fig. 3

LIQUID DISPENSING DEVICE WHICH DELIVERS A PRE-SET, CONSTANT VOLUME INDEPENDENT OF THE PRESSURE AND VOLUME OF THE LIQUID SUPPLIED TO IT

BACKGROUND OF THE INVENTION

There are many well-known devices for delivering constant volumes of liquids such as beverage bottling line fillers, drink dispensers, and refrigerator ice makers. These are static pressure devices sensitive to the pressure of a column of liquid or actuated by a timer. Other known devices include probe sensors able to monitor the level of a liquid entering a container of set volume.

The liquid dispensing devices described above have a series of unremediable drawbacks including relatively high production costs, inaccurate operation, poor durability, and non-uniform delivery volumes.

SUMMARY OF THE INVENTION

The purpose of the present invention is to provide a pre-set, constant volume dispensing device able to guarantee the accuracy and uniformity of the liquid volumes delivered. Said device has low production costs and operates dependably.

A further purpose is to create a device able to deliver constant volumes of liquids independent of the pressure and volume of the liquid supplied to it.

The present invention comprises two interdependent cylinders. One cylinder, which is attached to the other, controls the liquid inflow, and the other cylinder meters the liquid. The ancillary cylinder comprises an inflow port and two communicating passages; one of these passages is below the metering cylinder and the other is above it. Said ancillary cylinder includes a portion having a narrowed diameter and a small piston whose shaft carries two plugging devices or valves able to control said pssages and inflow port. Said small cylinder is actuated by a plunger against the reaction of elastic devices. A sealed piston is mounted in the metering cylinder; it can be actuated by the pressure of the liquid against the reaction of calibrated elastic devices. The metering cylinder is closed by a cap comprising an outflow port for the liquid being dispensed.

BRIEF DESCRIPTION OF THE DRAWINGS

The preferred form of the invention will be described further, by way of example, with reference to the accompanying drawings in which:

FIG. 1 is a vertical cut-away view of the device;

FIG. 2 and 3 are vertical cut-away views of the ancillary cylinder;

FIG. 4 is a variant of the device actuating the plunger.

DETAILED DESCRIPTION OF THE PREFERRED EMBODIMENT

With reference to FIG. 1, the complete device 1 comprises a cylinder 2 closed by a cap 3 that includes an outflow coupling 4. Element 5 indicates an orifice between the inside of cylinder 2 and lateral passage 6 communicating with zone 7a of ancillary cylinder 7, which includes a small diameter passage 8. Mobile piston 9 is housed in a sealed fashion in cylinder 2, and operates against the reaction of calibrated spring 10. Small piston 11 on a shaft of varying cross section is housed in cylinder 7; two valves 12,13 with O-rings are mounted on said shaft and have the purpose of sealing zone 8 comprising orifice 14; liquid flows through said orifice, which is below piston 9, into cylinder 2.

Small piston 11 is actuated by plunger 15; said plunger can be actuated by a thermal device 16 or by an electromagnet (FIG. 4). Both devices are equipped with two terminals 17 connected to a power source. The axial movement of small piston 11 occurs against the reaction of spring 17 mounted in chamber -A-; the liquid is supplied through a coupling 18, and flows into said chamber. "19" indicates a bracket supporting unit 16 or 16a.

The device operates as follows:

When electrothermal device 16 or electromagnet 16a is not excited, pistons 9 and 11 are in the positions shown in FIG. 1. The water or other liquid flowing into chamber -A-has no place to exit, independent of its volume and pressure. When device 16 or 16a is electrically excited plunger 15 moves axially from the position shown in FIG. 1 to that illustrated in FIG. 2, and finally to the fully extended position depicted in FIG. 3. Under these conditions the liquid that has flowed into chamber -A- exits through orifice 14 and enters cylinder 2 below piston 9. The pressure of the liquid overcomes the pressure exerted by calibrated spring 10 forcing piston 9 to move into position 9a illustrated by the dashed lines in FIG. 1; said piston remains in this position due to the presence of stops 3a located at the edges of cap 3.

Under these conditions, assuming cylinder 2 is empty, said cylinder is filled with liquid supplied through coupling 18. When the aforementioned devices causing the projection of plunger 15 ceases to be electrically excited, small piston 11 returns to the position shown in FIG. 1 owing to the pressure exerted by spring 17. When said piston arrives at this position, liquid can flow down through orifice 14 into zone 7a, and then into passage 6 communicating with cylinder 2 by means of orifice 5. The liquid that previously flowed into the area below the piston now flows back above cylinder 2; said piston is presently in the position indicated by the solid lines in FIG. 1 owing to the pressure exerted by calibrated spring 10.

When plunger 15 is again actuated as described above the operating cycle repeats. Piston 9, thanks to the pressure exerted by the liquid flowing in through orifice 14, rises towards cap 3 until it reaches position 9a. Therefore, said piston only meters the pre-established volume corresponding to the volume of cylinder 2 defined by positions 9-9a of piston 9.

Initially piston 9 may not fill on the first cycle, and may only partially fill cylinder 2 on those cycles immediately following the first. Then, volumetrically identical quantities of liquid will flow out through coupling 4 independent of the pressure and volume of the liquid supplied to chamber -A-, although the pressure of said liquid must be sufficient to counteract the pressure exerted by spring 10.

The volume of the liquid metered can be varied by removing cap 3 and modifying the height of stop(s) 3a.

Device 16 with actuating plunger 15 is preferably a thermoactuator comprising a casing enclosing a wax with high thermal dilative properties and a portion of said plunger. One or more thermistors (PTC) are associated with the casing. When electrically excited, said thermistors heat the casing causing the wax to expand forcing out the plunger. Said casings are described in patents No. 52873-B/85 and 53024-B/85 held by the applicant, and are used in numerous applications where a high degree of thrust is required. The variant illustrated in FIG. 4 is a solenoid 20 with a ferromagnetic core 21. Said variant is feasible, but uneconomical with respect to thermoactuator 16.

The above description illustrates the advantages of the device, which is functional, structurally simple, and has low production costs.

I claim:

1. A dispensing device for dispensing pre-set, constant volumes of liquids comprising:
    a cylinder for metering the liquid to be dispensed;
    a cap for closing one end of said cylinder, said cap including a port for outflow of the liquids and at least one stop;
    a sealed, mobile piston housed in said cylinder for expressing the liquid contained within said cylinder above said piston out through said port, said piston having a maximum extended position defined by said at least one stop;
    a first spring disposed between said cap and said piston for biasing said piston away from said cap;
    an ancillary cylinder associated with a base of said cylinder;
    a passage communicating said cylinder with said ancillary cylinder;
    a first orifice in said cylinder allowing the passage of the liquids from said cylinder to said passage;
    a second orifice between said cylinder and said ancillary cylinder for communicating an area of said cylinder under said piston with said ancillary cylinder;
    said ancillary cylinder comprising:
        a smaller diameter section;
        a small piston housed in said ancillary cylinder;
        a plunger for operating said small piston;
        a thermoactuator for actuating said plunger to axially move said small piston between a first and a second position;
        a chamber at one end of said ancillary cylinder having a larger diameter than that of the smaller diameter section;
        a second spring exerting pressure against a tip of the shaft of the small piston for biasing said small piston towards a position in which liquid can pass from the area of said cylinder under said piston into said passage;
        said chamber comprising a coupling for the inflow of liquids to be dispensed; and
        a dual ended valve disposed on a shaft of the small piston having spaced structures, one on each end of the valve and O-rings associated with the spaced structures, said valve moving in the smaller diameter section and being disposed such that one end is on either side of the second orifice for allowing liquid to pass through said second orifice from the area of said cylinder under said piston when said small piston is in the first position and from said chamber to the area under said piston when said small piston is in the second position.

2. The dispensing device as claimed in claim 1, wherein said ancillary cylinder comprises a zone at a second end thereof having a larger diameter than the smaller diameter section, and wherein the second orifice communicates with the chamber for receiving the liquid to be dispensed only when the small piston moves one end of the dual ended valve beyond the smaller diameter section of said ancillary cylinder owing to the action of said plunger, while another end of the dual ended valve seals off access to the zone.

3. The dispensing device as claimed in claim 1, wherein said thermoactuator comprises an electrically powered thermoactuator.

4. The dispensing device as claimed in claim 1, wherein said cylinder for metering is filled with liquid under pressure which enters from the chamber, which overcomes the bias exerted by said spring that is compressed at a top portion of said cylinder in the space between said cap and the maximum extended position of said piston for dispensing the liquid contained within said cylinder above said piston through said port.

5. The dispensing device as claimed in claim 1, wherein no direct communication occurs between the chamber and the portion due to the position of the second orifice which allows liquid to flow only into an area below said piston, regardless of the position of the small piston within said ancillary cylinder.

6. The dispensing device as claimed in claim 1, wherein the structure of the device including the two cylinders, the two pistons, the port, and the coupling is made of molded thermoplastics such as polypropylene, acetal resin, or glass-fiber reinforced polyamide.

7. The dispensing device as claimed in claim 1, further comprising a bracket for supporting the thermoactuator which is made of molded thermoplastics such as polypropylene, acetal resin, or glass-fiber reinforced polyamide.

* * * * *